Patented Feb. 12, 1952

2,585,323

UNITED STATES PATENT OFFICE 2,585,323

LINEAR PYROMELLITIC POLYESTERS AND THEIR DERIVATIVES

William E. Elwell, Berkeley, and Douglas C. McGowan, Richmond, Calif., assignors to California Research Corporation, San Francisco, Calif., a corporation of Delaware No Drawing. Application May 31, 1949, Serial No. 96,396

17 Claims. (Cl. 260—75)

This invention relates to linear pyromellitic polyester resins produced from pyromellitic anhydride and dihydric alcohols.

When 1 mol of pyromellitic anhydride and 2 mols of monohydric alcohol are reacted together, a monomeric diester of pyromellitic acid is formed readily in accordance with the reaction $$C_{10}H_2O_6 + 2ROH \rightarrow C_6H_2[(COOR)(COOH)]_2$$

It has been discovered that by employing 1 mol of a dihydric alcohol in lieu of the 2 mols of monohydric alcohol to 1 mol of pyromellitic anhydride in the above reaction, under the special conditions to be described hereinafter, valuable linear polymeric diesters of pyromellitic acid can be produced from pyromellitic anhydride and dihydric alcohols. These polymeric pyromellitic diesters of a dihydric alcohol are constituted by linear chains $$[-OOC \cdot C_6H_2 \cdot (COOH)_2 \cdot COOR-]_n$$

in which R represents the hydrocarbon residue of the dihydric alcohol, the radical $\cdot C_6H_2 \cdot$ is the residue of the benzene nucleus of pyromellitic anhydride and $n$ is a number greater than one.

In the particular process of the present invention, the esterification is restricted substantially completely to di-esterification of pyromellitic anhydride, and only the anhydride groups participate in the reaction. The carboxyl groups which are being formed by partial esterification of the anhydride groups do not exercise their functionality under the particular conditions of temperature, and thus cross-linking between these carboxyl groups and the hydroxyl group of unreacted dihydric alcohol is precluded. Consequently, each unit in the linear chain of the resulting polymeric product will contain two free carboxyl groups and two ester groups. The term diester is used hereinafter to designate the number of ester groups on each pyromellitic anhydride nucleus and, obviously, not the number of esters in the molecule when polymerized.

Contrary to what could have been expected on the basis of what is known in the art with respect to the effects of reacting dihydric alcohols with pyromellitic acid, citric acid, tricarballylic acid and other organic acids with 3 or more carboxyl groups, the product of reaction between a dihydric alcohol and pyromellitic anhydride, instead of being an infusible, insoluble, cross-linked resinous mass, is a thermoplastic linear polyester of relatively high molecular weight, soluble in polar organic solvents, such as alcohols, ketones and esters.

Owing to the presence of free carboxyl groups, the polymeric diesters of the present invention possess a functionality uncommon in other types of linear polymers, and constitute, therefore, valuable and attractive intermediates for a great variety of industrial applications. In particular, the polymeric pyromellitic diesters of dihydric alcohols, prepared in accordance with the process of the present invention, form salts with monovalent inorganic and organic bases, such as lithium, sodium, potassium, ammonium, amines, morpholine, pyridine and the like. These salts are found to be suitable for many useful purposes, as will be indicated hereinafter.

It is to be emphasized, however, that a number of conditions should be observed for the successful operation of the process for producing polymeric pyromellitic diesters of this invention and to avoid cross-linking to infusible, insoluble products by ester interchange, these conditions being entirely different from the conditions of the conventional resin manufacture.

Pyromellitic anhydride and a dihydric alcohol are reacted at a relatively low temperature from about 25° C. to about 120° C., preferably in solution or dispersion in a suitable diluent which is also a solvent for the ultimate linear polymeric diesters. No catalyst is necessary for the reaction, which is completed within 15 minutes to 6 hours, depending on the particular temperature and the nature of the dihydric alcohol employed. When a glycol is employed, the reaction will necessitate a longer period of time than when a monoglyceride serves as the dihydric alcohol. Upon completion of the reaction the solvent is removed by evaporation (either under vacuum or by the application of heat, or by both). The remaining polymeric diester product is a light-colored, friable, acid resin, characterized by a high melting point and solubility in water and polar organic solvents. It dissolves in solutions of monovalent bases with the formation of corresponding polymeric water-soluble salts. If so desired, the linear polymeric diester product, prepared as described hereinabove, may be subjected to additional heating up to a temperature of about 200° C. without causing excessive cross-linking. The product resulting from this additional heating treatment is for the most part soluble in polar organic solvents and usually is insoluble in water, but will dissolve or form a colloidal suspension or dispersion in an aqueous solution of sodium hydroxide.

The preparation of the polymeric diesters of this invention is preferably carried out in solution or dispersion in an anhydrous, low-boiling, inert diluent, for example, acetone, methyl ethyl ketone, or the like. The application of such a fluid, volatile diluent, by facilitating an intimate contact between the pyromellitic anhydride and the dihydric alcohol, insures the maximum linear chain-growth for polymeric diesters. The diluent is easily removed upon completion of the reaction by evaporation at a temperature lower than the temperature at which the esterification of free carboxyl groups would begin to occur.

An important prerequisite for the preparation of high molecular weight polymeric diesters of this invention consists of avoiding any excess of dihydric alcohol as well as in insuring a substantial freedom from chain-stopping materials, in particular, from water and monohydric alcohols, such as diglycerides. Trihydric alcohols, e. g., glycerol and, in general, polyhydric alcohols containing more than two hydroxyl groups, should be substantially absent from the reaction mixture in order to prevent cross-linking.

The dihydric alcohols suitable as initial materials for the production of polymeric diesters of the invention by reaction with pyromellitic anhydride, include the various saturated and unsaturated glycols, e. g., ethylene glycol, di-, tri- and tetraethylene glycols, propylene glycol, butylene glycol, amylene glycol, pinacol, xylylene alcohols, e. g., phthalyl alcohols, as well as the monoglycerides of various fatty oils and fatty oil acids, such as soybean-oil monoglyceride, monostearin, and the like. Because substantial freedom from monohydric and trihydric alcohols is required for the effective operation of the invention, in employing dihydric alcohols, such as the fatty-oil monoglycerides produced by ester-interchange from glycerol and fatty-oil acids, the monoglyceride is preferably subjected to a careful purification by fractional distillation, or by other suitable methods, to remove the diglycerides and glycerol which may be present in admixture with the monoglyceride material. Furthermore, in those cases where the dihydric alcohol, such as soybean-oil monoglyceride, or the like, may contain unsaturated carbon to carbon double bonds, the reaction with pyromellitic anhydride should be preferably effected under anhydrous conditions in the atmosphere of an inert gas to avoid the risk of cross-linking by air oxidation of the double bond.

In order to illustrate the invention with greater clarity, to emphasize the optimum conditions for its operation, and to demonstrate the various characteristics of the resulting linear polymeric pyromellitic diesters of dihydric alcohols, a number of examples are given hereunder.

*Example 1.*—This example is given to illustrate the effect of heating together pyromellitic anhydride and a dihydric alcohol at a high temperature. 23.35 g. of pyromellitic anhydride and 6.65 g. of ethylene glycol are used, but in the absence of a solvent or diluent good mixing is impossible. When this mixture is heated to 185° C. in the atmosphere of carbon dioxide, considerable water evolves, leaving a glassy, infusible, insoluble mass, which obviously results from cross-linking.

*Example 2.*—This example is given in order to show the feasibility of formation of linear polymers from pyromellitic anhydride and dihydric alcohols at a temperature as low as 35 to 40° C. in the presence of a solvent.

The reactants, namely, 8.91 g. of pyromellitic anhydride and 2.54 g. of ethylene glycol are dispersed in 75 ml. of acetone, and their mixture is heated to 35° C. When heating is stopped, the temperature rises to 40° C. and then slowly decreases. The bulk of acetone is removed under vacuum without heating, the remainder of acetone being evaporated by heating on a steam hot plate in an open beaker with vigorous stirring. The remaining product is a translucent resin, readily soluble in water and acetone, softening at about 50° C., fluid at 80° C. and tacky at room temperature.

*Example 3.*—This test is effected in order to ascertain whether the molecular weight of the reaction product in Example 2 could be raised by heating to a higher temperature, such as 185° C., without causing excessive cross-linking. The product of the preceding Example 2 is heated in an oil bath for 3.5 hours to 185° C. Some water evolves, and the product, while becoming more viscous, remains thermoplastic at 185° C. When cooled, it forms a brittle, hard and friable mass. Upon being comminuted to a powder, it is introduced into water and swells to a gel, but does not dissolve. However, this gel dissolves in water containing an amount of sodium hydroxide equivalent to the estimated proportion of available free carboxyl groups in the product, except for a small gelatinous flock of about 0.5%. Apparently cross-linking just begins at this high temperature. The acid number of this polymeric diester is determined to be equal to 402, indicating a high molecular weight.

*Example 4.*—This example offers a further proof that the reaction product of pyromellitic anhydride and a dihydric alcohol is a linear polymer, as may be concluded from its high molecular weight and its rapid solubility in water. About 10.9 g. of pyromellitic anhydride is dispersed in 100 ml. of acetone. Ethylene glycol in an amount of 3.1 g. is likewise dissolved in 50 ml. of acetone, and this last solution is added dropwise at room temperature (26.5° C.) with constant stirring to the pyromellitic anhydride dispersion. Acetone is evaporated on a steam hot plate under vacuum, and the product appears as a solid, easily friable foam. When powdered, it does not melt on the steam hot plate (at 100° C.), but melts readily at low heat on an electric hot plate (above 120° C.). This behavior indicates a fairly high molecular weight of the product. It dissolves rapidly in water indicating a linear structure and the absence of cross-linking.

*Example 5.*—A different type of dihydric alcohol is used in this example, namely, 31.9 g. of soybean-oil monoglyceride. This monoglyceride is dissolved in 100 ml. of acetone together with 19 g. of pyromellitic anhydride. The temperature rises from 26.5° C. (room temperature) to 30° C., falling back to the original 26.5° C. after complete solution. The beaker containing the solution is warmed on a steam bath for 1½ hours and, upon evaporation of most of the acetone, the solution is allowed to stand in open air from 48 to 72 hours, after which a dry skin is found formed on the surface of the solution. This skin is apparently the result of cross-linking through the double bond of the fatty acid, and confirms the advisability of excluding air-oxygen with inert gas when employing monoglycerides containing unsaturated double bonds. The remaining acetone is removed by heating on a steam hot plate in the atmosphere of carbon dioxide and, finally, by heating under vacuum. The product appears to be slightly tacky, just hard enough to be friable. In water, its powder forms a stable milky suspension; however, in water containing sufficient sodium hydroxide to neutralize the free carboxyl groups, the solution becomes clearer, although still remaining opalescent.

*Example 6.*—This example indicates that some cross-linking will occur when the product of the preceding test (5) is heated to a higher temperature of 200° C. The resulting rubbery material of low tensile strength does not dissolve in water, but yields a milky colloidal suspension in a solution of sodium hydroxide containing enough alkali to neutralize the carboxyl groups of the polymeric diester.

*Example 7.*—The results of this test show the formation of a linear polymer of high molecular weight by employing substantially anhydrous reactants. Ethylene glycol (24.8 g.) is dissolved in 100 ml. of C. P. acetone. The solution is dried over sodium sulfate. 87.2 g. of pyromellitic anhydride is added to 500 ml. of C. P. acetone which has been dried over sodium sulfate. The glycol solution is filtered at room temperature (26.5° C.) into the anhydride solution, and the filter washed with dried, C. P. acetone. The acetone is then evaporated at a temperature just below its boiling point. The remaining product is pulverized and dried for 4 hours at 100° C. and 5 mm. pressure. It is largely, but not entirely, soluble in water and dissolves rapidly and completely in aqueous sodium hydroxide containing sufficient hydroxyl to neutralize the carboxyl groups of the polymeric diester. The fact that the product fails to melt when heated at 100° C. is indicative of its fairly high molecular weight, whereas the solubility in water and in a solution of sodium hydroxide indicates linearity of the diester product.

*Example 8.*—This last test illustrates the application of another type of dihydric alcohol to produce linear polymeric diesters of high molecular weight with pyromellitic anhydride.

Equimolar amounts of soybean-oil and pentaerythritol are heated together at 230° C. in an atmosphere of carbon dioxide in the presence of 0.1% NaOH. The product, essentially an equimolar mixture of a fatty acid diester of pentaerythritol and soybean-oil monoglyceride, is heated with 2 mols of pyromellitic anhydride (per one mol of either the original pentaerythritol or soybean-oil) made into a thin slurry with the aid of acetone. This heating is effected to about 60° C. under reflux. Thereupon toluene is added to the reaction mixture, and the diluted mixture is distilled to a reflux temperature of 100° C. to remove acetone. The remaining solvent is then stripped off at 90° C. and 1 mm. pressure. The product is collected as a soapy solid with an acid number of 153, and is fusible, brittle and readily soluble in benzene, acetone and chloroform. It forms a cloudy emulsion in hot water. In aqueous sodium hydroxide it produces stable, milky, foamy emulsion.

It has been pointed out hereinbefore that the linear polymeric diesters of the present invention form water-soluble salts with monovalent organic and inorganic bases. These salts possess a number of valuable properties, among which the tendency of increasing the viscosity of various industrially useful compositions and solutions is particularly remarkable.

In order to illustrate this property of enhancing the vicosity of solutions, sodium salts of polymeric pyromellitic diesters are formed from the materials obtained in Examples 3, 4, 5, 6 and 7, and the viscosities of 1% solutions of these salts in water at 25° C. are measured and tabulated in the table below.

*Table.—Viscosity of 1% aqueous solution of sodium salt of polymeric pyromellitic diester at 25° C.*

|  | Example No.— | | | | |
|---|---|---|---|---|---|
|  | 3 | 4 | 5 | 6 | 7 |
| Viscosity at 25° C. in centistokes | 1.07 | .97 | .99 | .98 | .98 |
| Specific viscosity at 25° C. | 1.20 | 1.09 | 1.11 | 1.10 | 1.10 |

Because of their valuable properties, the aforementioned salts of organic and inorganic bases of polymeric diesters of pyromellitic acid may be successfully adapted for a variety of applications, for instance, as additives to detergents, as thickening, softening and sizing agents in the cellulose, leather, paper, textile and allied industries, and also as corrosion inhibitors and additives to lubricating oils. Another attractive application for these salts may be found in emulsifying water-base paints. Successful emulsifying agents will be provided by the salts of those of the polymeric pyromellitic diesters which contain long hydrocarbon chains with at least 8 carbon atoms, e. g., diesters produced from soybean-oil monoglyceride and pyromellitic anhydride or diesters produced from cetyl glycol and pyromellitic anhydride.

It may be also noted at this point that polymeric diesters prepared from pyromellitic anhydride and monoglycerides of various fatty oils and fatty oil acids are soluble in liquid petroleum hydrocarbons, such as gasoline and kerosene, whereas the diesters produced from pyromellitic anhydride and the various glycols are not.

In conclusion, it is to be understood that the specific examples disclosed in the above specification are not to be deemed as limitations of the invention, but merely as illustrations of the linear polymeric pyromellitic diesters and of the process of preparing the same. Consequently, the linear polymeric pyromellitic diesters and their monovalent salts are not limited to any specific embodiment of the invention, except as defined in the appended claims.

We claim:
1. A linear polymeric diester as set forth in claim 11, wherein said organic material is a glycol.
2. A linear polmeric diester as set forth in claim 11, wherein said organic material is a monoglyceride of a fatty oil acid.
3. A linear polymeric diester as set forth in claim 11, wherein said organic material is ethylene glycol.
4. A linear polymeric diester as set forth in claim 11, wherein said organic material is soybean-oil monoglyceride.
5. A process as defined in claim 16, wherein said inert diluent is acetone.
6. A process as defined in claim 16, wherein said reaction between pyromellitic anhydride and dihydric alcohol is effected under substantially anhydrous conditions.
7. A salt as defined in claim 12, wherein said monovalent base is an inorganic base.
8. A salt as defined in claim 12, wherein said monovalent base is an organic base.
9. A process as defined in claim 14, wherein said organic material is a monoglyceride of a fatty oil acid substantially free from diglycerides and glycerol.
10. A process as defined in claim 14 wherein said organic material is a monoglyceride of a fatty oil acid containing unsaturated carbon bonds and said reaction between pyromellitic anhydride and said monoglyceride is effected under anhydrous conditions in an atmosphere of an inert gas.

11. A linear polymeric pyromellitic diester of an organic material selected from the group which consists of dihydric alcohols and partial esters of glycerol and pentaerythritol having two unreacted hydroxyl groups, the two hydroxyl groups of said organic material being the only functional groups reactive with pyromellitic anhydride at a temperature from about 25° C. to about 120° C., said polymeric diester being further characterized by its thermoplasticity, solubility in polar organic solvents, and by being capable of forming water-soluble salts with monovalent inorganic and organic bases.

12. A salt of a monovalent base and a linear polymeric pyromellitic diester of an organic material selected from the group which consists of dihydric alcohols and partial esters of glycerol and pentaerythritol having two unreacted hydroxyl groups, the two hydroxyl groups of said organic material being the only functional groups reactive with pyromellitic anhydride at a temperature from about 25° C. to about 120° C.

13. A sodium salt of a linear polymeric pyromellitic diester of dihydric alcohol in which the hydroxyl groups are the only functional groups reactive with pyromellitic anhydride at a temperature from about 25° C. to about 120° C.

14. A process for preparing linear polymeric pyromellitic diesters, which comprises dispersing in an inert anhydrous diluent which is a solvent for said polymeric diesters, an approximately equimolar mixture of pyromellitic anhydride and an organic material selected from the group consisting of dihydric alcohols and partial esters of glycerol and pentaerythritol having two unreacted hydroxyl groups, the two hydroxyl groups of said organic material being the only functional groups reactive with pyromellitic anhydride at a temperature from about 25 to about 120° C., and heating such dispersion to a temperature in the range from about 25° C. to about 120° C. for a time sufficient to esterify substantially all of the hydroxyl groups present in said dispersion.

15. A sodium salt of a linear polymeric pyromellitic diester of an organic material selected from the group consisting of dihydric alcohols and partial esters of glycerol and pentaerythritol having two unreacted hydroxyl groups, the two hydroxyl groups of said organic material being the only functional groups reactive with pyromellitic anhydride at a temperature from about 25° C. to about 120° C.

16. A process for preparing linear polymeric pyromellitic diesters of dihydric alcohol having two unreacted hydroxyl groups, said two hydroxyl groups being the only functional groups reactive with pyromellitic anhydride at a temperature from about 25° C. to about 120° C., which process comprises heating a dispersion of one mol of pyromellitic anhydride and one mol of dihydric alcohol in an inert, anhydrous diluent which is a solvent for said polymeric diester, to a temperature from about 25° C. to about 120° C., for a time sufficient to esterify substantially all of the hydroxyl groups in the reaction mixture.

17. A process for preparing linear polymeric pyromellitic diesters of dihydric alcohol having two unreacted hydroxyl groups, said two hydroxyl groups being the only functional groups reactive with pyromellitic anhydride at a temperature from about 25° C. to about 120° C., which process comprises heating a dispersion of one mol of pyromellitic anhydride and one mol of dihydric alcohol in an inert, anhydrous diluent, which is a solvent for said polymeric diester, to a temperature from about 25° C. to about 120° C., evaporating the diluent, heating the remaining product up to about 200° C., and recovering the final thermoplastic polymeric pyromellitic diester product dispersible in an aqueous dispersion of sodium hydroxide.

WILLIAM E. ELWELL.
DOUGLAS C. McGOWAN.

REFERENCES CITED

The following references are of record in the file of this patent:

UNITED STATES PATENTS

| Number | Name | Date |
|---|---|---|
| 1,998,744 | Ubben | Apr. 23, 1935 |